(12) United States Patent
Mezaael

(10) Patent No.: US 11,050,611 B2
(45) Date of Patent: Jun. 29, 2021

(54) SYSTEMS AND METHODS FOR NODE CONFIGURATION SETTINGS

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 91 days.

(21) Appl. No.: 16/561,686

(22) Filed: Sep. 5, 2019

(65) Prior Publication Data

US 2021/0075670 A1    Mar. 11, 2021

(51) Int. Cl.
*H04L 12/24*    (2006.01)
*H04L 29/08*    (2006.01)

(52) U.S. Cl.
CPC .......... *H04L 41/08* (2013.01); *H04L 41/0813* (2013.01); *H04L 41/0873* (2013.01); *H04L 67/12* (2013.01)

(58) Field of Classification Search
CPC ..... H04L 67/12; H04L 41/08; H04L 41/0813; H04L 41/0873
See application file for complete search history.

(56) References Cited

U.S. PATENT DOCUMENTS

| | | | |
|---|---|---|---|
| 2010/0228404 A1* | 9/2010 | Link, II | G06F 9/44542 701/1 |
| 2018/0272964 A1* | 9/2018 | Netter | H04L 67/34 |
| 2019/0222575 A1* | 7/2019 | Oberhauser | H04L 63/0869 |
| 2019/0235857 A1* | 8/2019 | Ishiguro | B60R 16/023 |
| 2019/0333059 A1* | 10/2019 | Fallah | G06F 16/1834 |
| 2020/0245234 A1* | 7/2020 | Omiya | H04L 12/46 |

* cited by examiner

*Primary Examiner* — Minh Chau Nguyen
(74) *Attorney, Agent, or Firm* — Brandon Hicks; Eversheds Sutherland (US) LLP

(57) ABSTRACT

Systems and methods are provided herein for node configuration settings. The systems and methods provided herein may involve receiving configuration settings of configuration systems for various nodes in a network of nodes, and saving such settings to ledgers accessible by each of the nodes on the network of nodes. The ledgers may have the same configuration settings information such that each node in the network of nodes is apprised of the configuration settings for all of the other nodes in the network of nodes.

2 Claims, 3 Drawing Sheets

SYSTEMS AND METHODS FOR NODE CONFIGURATION SETTINGS

TECHNICAL FIELD

The present disclosure relates to systems and methods for node configuration settings.

BACKGROUND

The use of configuration settings and devices for implementing such settings for various types of nodes in a network of nodes may allow for the configuration of certain features of the nodes that may automatically be triggered in particular situations. An example of such configuration settings in nodes may include Upfitter Interface Modules (UIMs) that may be installed in certain types of vehicles. For example, a police cruiser may have a UIM installed that is configured to enable certain functions of the cruiser when the sirens are turned on (e.g., initiate camera recording). Such configuration settings may be beneficial for the effective operation of the node, but may be vulnerable to one or more problems. For example, the node may have stored numerous configuration settings and may be vulnerable to attacks by hackers who may desire to change configuration settings or add new configuration settings that have negative impacts on the operation of the node. In other examples, if new nodes are added to the network or nodes, or configuration settings are lost, it may be difficult to reconfigure such settings manually.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
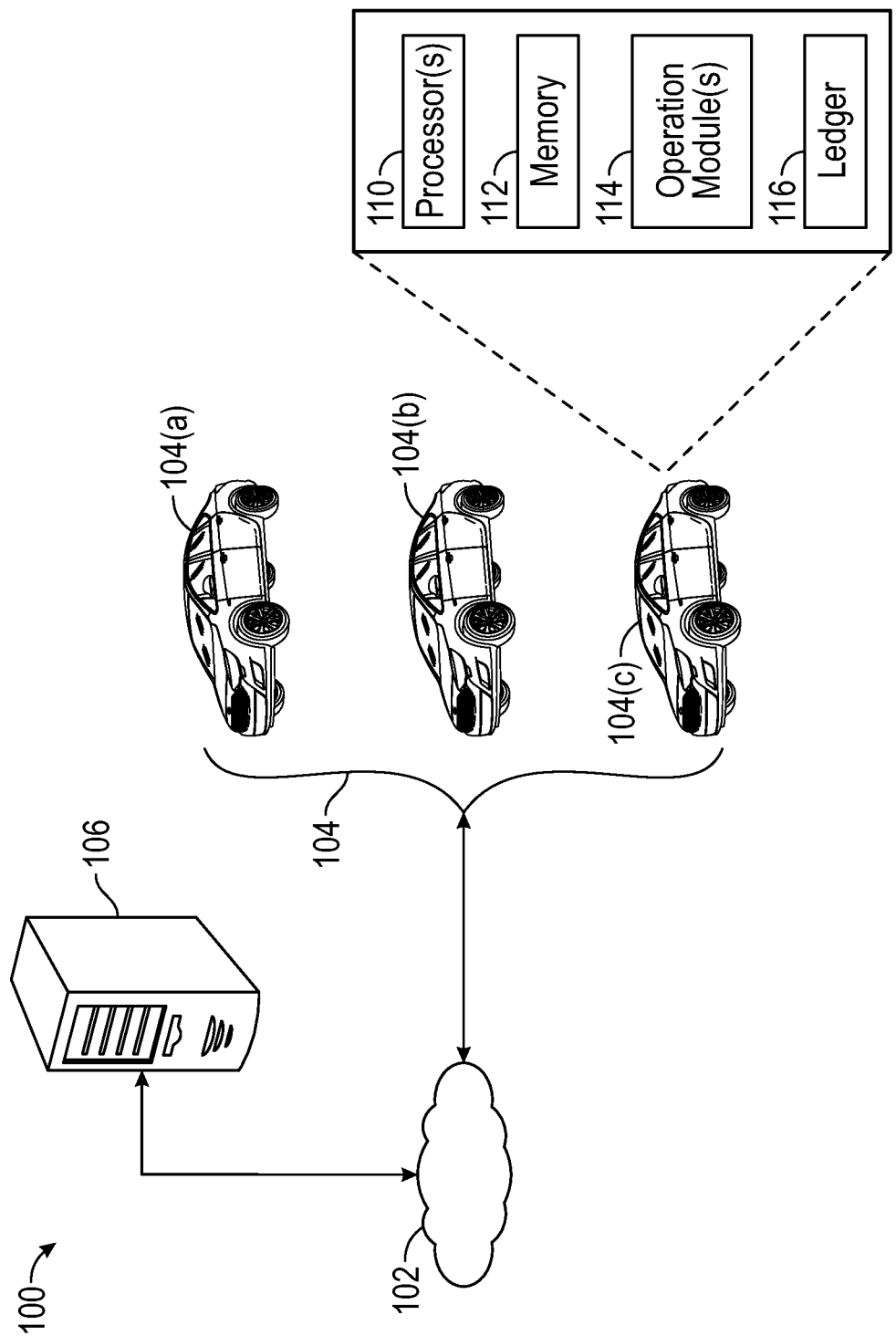
FIG. 1 depicts an illustrative architecture in accordance with one or more example embodiments of the disclosure.

The disclosure is directed to, among other things, systems and methods for node configuration settings. In some embodiments, the systems and methods disclosed herein more particularly relate to allowing for shared configuration settings across a network of nodes, such that each node of the one or more nodes is knowledgeable of not only its own configuration settings, but also the configuration settings of other nodes.

In some embodiments, the nodes may be in any number of forms, such as police vehicles, rescue vehicles, ambulance and quick response vehicles, public utility vehicles, tow trucks, light bars, beacons, traffic advisors, dash and deck lights, undercover lighting, power control systems, push bumpers and gun racks or any other element capable of having configuration settings. As one particular example, a police cruiser vehicle may have a configuration setting that triggers certain features of the cruiser when the siren lights are turned on, such as engaging sport mode, initiating camera recording, muting alerts within the vehicle, etc. However, any number of other types of nodes and configuration settings examples may be applicable.

In some embodiments, the network of nodes may comprise a fleet of nodes, such as, for example, a fleet of police cruisers. Each node in the network of nodes may have its own individual configuration settings, all of the nodes in the network of nodes may have identical configuration settings, or certain nodes of the network of nodes may share configuration settings whereas others may not. All of the nodes in the network of nodes may know all of the configurations settings for each of the other nodes in the network of nodes through a decentralized ledger system, such as, for example, a blockchain system. That is, each of the nodes may have stored, or otherwise may have access to, a ledger that includes real-time information about the configuration settings for each of the nodes of the network of nodes. The ledgers that each node has access to may be identical, and may update in real time such that if a change to a configuration setting or a new configuration setting were to take place at one or more nodes of the network of nodes, each of the ledgers at each of the nodes would reflect such change or addition. This would allow an internal or external party or system to determine all of the configurations settings for all of the individual nodes on the network of nodes simply be accessing one of the ledgers associated with one of the individual nodes.

The configuration settings may in the form of settings implemented on an Upfitter Interface Module (UIM), which may be an optional factory installed device that has the ability to manage equipment via user provided inputs a vehicle Controller Area Network (CAN) data signals. The UIM switches may be configured via different methods such as computer systems, dealer tools, cloud applications, and other methods. In some instances, it may be difficult to keep track of changes and modifications made to the UIM switches and it may also be difficult to verify functionality validation since UIM switches can be configured and modified via different sources and methods. Modification may include logics and timers set for each switch or feature. There may be no guarantee that any hacker who can access to a police vehicle may be able to access the UIM and change configuration which makes tampering very possible.

The configuration settings may also be captured by a snapshot system. The snapshot system may be located at the nodes themselves. The snapshot system may capture any relevant data relating to the configuration settings, such as triggering events for performing actions associated with the configuration settings, the actions that are performed, and any other relevant data associated with the configuration settings, and may store such data pertaining to a configuration setting in a "snapshot." For example, the snapshot system may capture a configuration setting that is used to modify systems of a vehicle when a weather condition trigger is detected (e.g., rain), and this configuration setting may be stored in a snapshot. Another snapshot may include data relating to a configuration setting for turning on particular lights of the vehicle when a light sensor detects that it is currently dark in the environment of a vehicle. Such snapshots of configuration settings may be stored locally at the node itself, or at a remote system, such as a cloud platform, for example.

In some embodiments, the snapshot system may also be useful for obtaining data from node systems, for example, obtaining data from vehicle systems. In the example case where the node is a vehicle, the snapshot system may be able to analyze and determine which alternative vehicle data source may provide a desired piece of information. Examples of such vehicle data sources may include the vehicle CANbus, Data Identifier (DID) or Diagnostics Trouble Code (DTC) systems, or other vehicle data system. As a continuation of the vehicle example, tire pressure data may be an integral piece of information for police cruiser vehicles that must be able to withstand road conditions during high speed pursuits. Thus, a UIM configuration setting for a pursuit may involve a determination based on a tire pressure value. If a CAN signal is not available for determining the tire pressure value, the snapshot system can determine an alternative vehicle system for obtaining the data, such as DID or DTC.

In some embodiments, it may be desired to alter configuration settings on one or more of the nodes, or it may be desired to add a new configuration setting to one or more of the nodes. In such cases, validation may be performed on the attempted new configuration setting or change to an existing configuration setting. The validation may involve sending a request to validate the proposed configuration setting to an external system before the configuration setting is implemented on the one or more nodes. In some instances, the external system may be the snapshot system. In some instances, the external system may be any of the other nodes. In some instances, the external system may be a fleet manager, which may be a device or user responsible for managing the network of nodes. A determination may be made at the external system as to the validity of the new configuration setting, and the configuration setting may either be accepted or rejected. If the configuration setting is accepted, then it is implemented at the node and all of the ledgers of the nodes may be updated to reflect the new configuration setting at the particular node. If the configuration setting is rejected, then it does not become implemented and the ledgers remain the same. One particular example of the purpose of such validation may be to prevent hackers from maliciously changing configuration settings on particular nodes of the network of nodes.

Validation of new configuration settings or changes to existing configuration settings may be made by a fleet manager responsible for managing a network of nodes. For example, an notification of the attempted configuration setting addition or change may be sent to the fleet manager through a device either internal or external to the network of nodes, such as a node management system on a particular device, cloud platform, etc. The fleet manager may then be able to view the attempted configuration setting addition or change and may make a decision as to the validity of the configuration setting. The fleet manager may then choose to either accept or reject the configuration setting.

Validation of the new configuration setting or changes to an existing configuration setting may also be performed by a snapshot system. The snapshot system may contain information such as previous configuration settings and/or rules pertaining to configuration settings in general and/or configuration settings for particular types of nodes or particular networks of nodes. The snapshot system may take the attempted new configuration settings or changes to existing configuration settings and compare them to the previous configuration settings and/or configuration settings rules to determine the validity of the new configuration settings or changes to existing configuration settings. The snapshot system may then choose to either accept or reject the configuration setting.

Validation of the new configuration setting or changes to an existing configuration setting may also be performed by any of the nodes on the network of nodes. For example, the snapshot system may be stored locally on the nodes, or the nodes may be able to make the same determinations using the information stored in the ledgers as well as locally-stored rules for configuration settings.

In some embodiments, the configuration settings stored on each of the node ledgers may be used to configure new nodes that may be added to the network of nodes, or in configuring additional nodes outside the network of nodes. In some instances, nodes that are added to the network of nodes or are outside the network of nodes may be similar to preexisting nodes. For example, a network of nodes may be in the form of a fleet of construction vehicles including one or more cranes and one or more dump trucks, and a new dump truck may need to be configured. In this particular example, the configuration settings for preexisting dump trunks in the fleet of construction vehicles may be used to configure the new dump truck such that the new dump truck includes the same configuration settings. The ledgers of the fleet of construction vehicles may then be updated to include the new dump trunk with the configurations settings that were applied to the new dump truck. Similar applications of configuration settings may be useful in other scenarios, such as when a node on a network of nodes loses configuration settings, or is otherwise reset. In such a case, the configuration settings for that same node may still be stored on the ledger, or similar configuration settings may be stored on the ledger for a similar type of node. These configuration settings may be used to reconfigure the node.

The same process of using configuration settings for one type of node to configure a new node may be applied to more than one node, or even to an entire network of nodes. For example, configuration settings for a first fleet of police vehicles may be used to configure an entire second fleet of police vehicles that have not yet been configured, or need to be re-configured with different configuration settings. In such cases, because the configuration settings for all of the nodes of the network of nodes is stored on each individual node's ledger, information from a ledger may be extracted and applied to the nodes of the new network of nodes.

The capability of a network of nodes to seamlessly update or newly configure new nodes, or for external nodes or networks of nodes to be configured, may provide at least the benefits of simplifying the configuration process and reducing configuration costs. For example, nodes may not need to be configured manually or through dealer tools or cloud application data transmissions.

Illustrative Embodiments

Turning now to the drawings, FIG. 1 depicts an illustrative architecture 100 in which techniques and structures of the present disclosure may be implemented. The illustrative architecture 100 may include a communications network 102, a one or more nodes 104, which may include at least nodes 104(*a*), 104(*b*), and 104(*c*), and a server 106. In some embodiments, the one or more nodes 104 may be in the form of vehicles, however the nodes 104 may also be in the form of any other object. For simplicity sake, references made herein to a node 104(*a*) may be made, however, such references may also be equally applicable to any other node of the one or more nodes 104.

In some embodiments, the communications network 102 may include any one or a combination of multiple different types of networks, such as cable networks, the Internet, wireless networks, and other private and/or public networks. In some instances, the communications network 104 may include cellular (e.g., 5G), Wi-Fi, or Wi-Fi direct.

In some embodiments, a node 104 may comprise at least one or more processor(s) 110, memory 112, one or more configuration settings module(s) 114, and a ledger 116. In some embodiments, the functionality of the module(s) described herein (for example, the configuration settings module(s) 114) may also be implemented as a single module or any other number of module(s).

In some embodiments, the node 104 may include one or more processors 110 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 112 as needed for execution. The processor 110 may be configured to execute the computer-executable instructions to cause various operations to be performed. Each processor 110 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The memory 112 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 112 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The configuration settings module(s) 114 may perform operations including at least receiving a first set of configuration settings for a first configuration system one or more configuration systems of a first node of one or more nodes. The operations may also include saving the first set of configuration settings to a ledger, wherein the ledger or a copy of the ledger is accessible by the one or more nodes. The operations may also include any other operations described herein.

The ledger 116 may be a decentralized and distributed information source that may be continuously updated, distributed and/or stored at a node. All other nodes of the one or more nodes 104 may also have access to and/or have stored a similar ledger 116 so that all nodes may be apprised of the same ledger information at any given time. For example, the ledger 116 may include information described with reference to FIG. 2, such as configuration information associated with a particular node 104(*a*).

In some embodiments, the server 106 may serve as a remote cloud platform or other type of external system for performing any of the functionality described herein, such as the operations with respect to the node 104(*a*). For example, the server may hold the snapshot system or maybe accessible by the fleet manager to make validation determinations.

Figure 2:
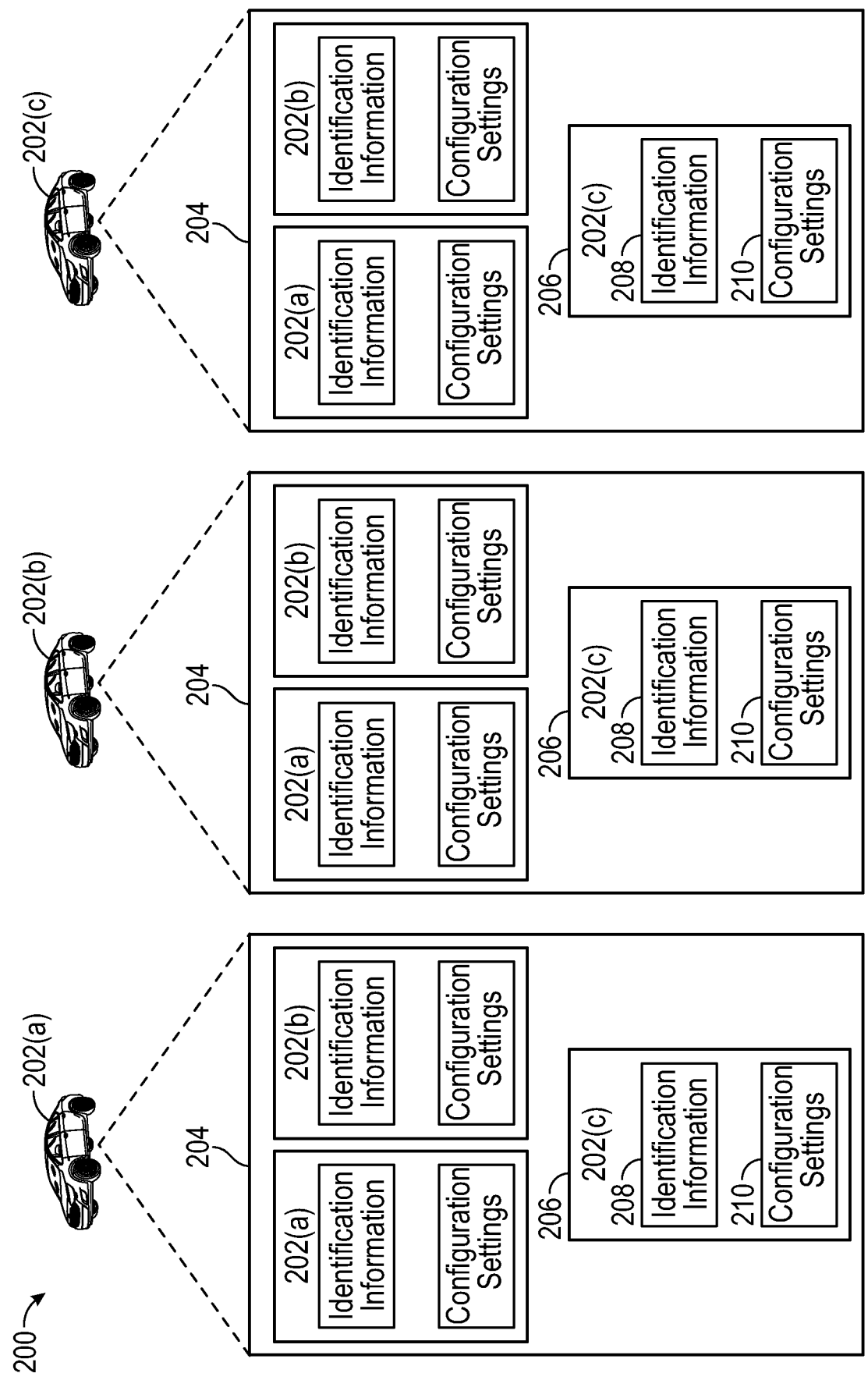
FIG. 2 depicts example node ledger architecture in accordance with one or more example embodiments of the disclosure.

FIG. 2 depicts examples nodes 200, which may include at least node 202(*a*), node 202(*b*), and node 202(*c*) (which may be the same as nodes 104(*a*), 104(*b*), and 104(*c*) of the one or more nodes 104). A node 202(*a*) may include, or otherwise have access to, a ledger 204 (which may be the same as ledger 116). The ledger 204 may be stored at, or otherwise accessible by, each of the nodes 202(*a*), 202(*b*), and 202(*c*), such that each one the nodes may have access to the same information.

The ledger may include node-specific information 206 for a node (e.g., node 202(*a*)). The node-specific information 206 may include identification information 208 and configuration settings 210 for the node (e.g., node 202(*a*)). The ledger may also include node-specific information 206 for each of the other nodes (e.g., 202(*b*) and 202(*c*)). The identification information 208 may include an identifier that is used to recognize the particular node (e.g., node 202(*a*)) that the node-specific information 206 is associated with. In one example, the node may be a vehicle and the identification information 208 may be the vehicle's VIN. The configuration settings 210 may include saved configuration settings for the particular node (e.g., node 202(*a*)) that the node-specific information 206 is associated with. In some instances, the configuration settings 210 may include upfitter module settings, such as settings that are automatically triggered in certain scenarios. For example, a police cruiser may have associated a configuration setting for performing certain alternations to the cruiser when the police officer initiates a chase by turning on the cruiser sirens. Thus, each node may have knowledge of not only its own configurations settings 210, but also each other node's configuration settings 210 through the ledger 204.

Figure 3:
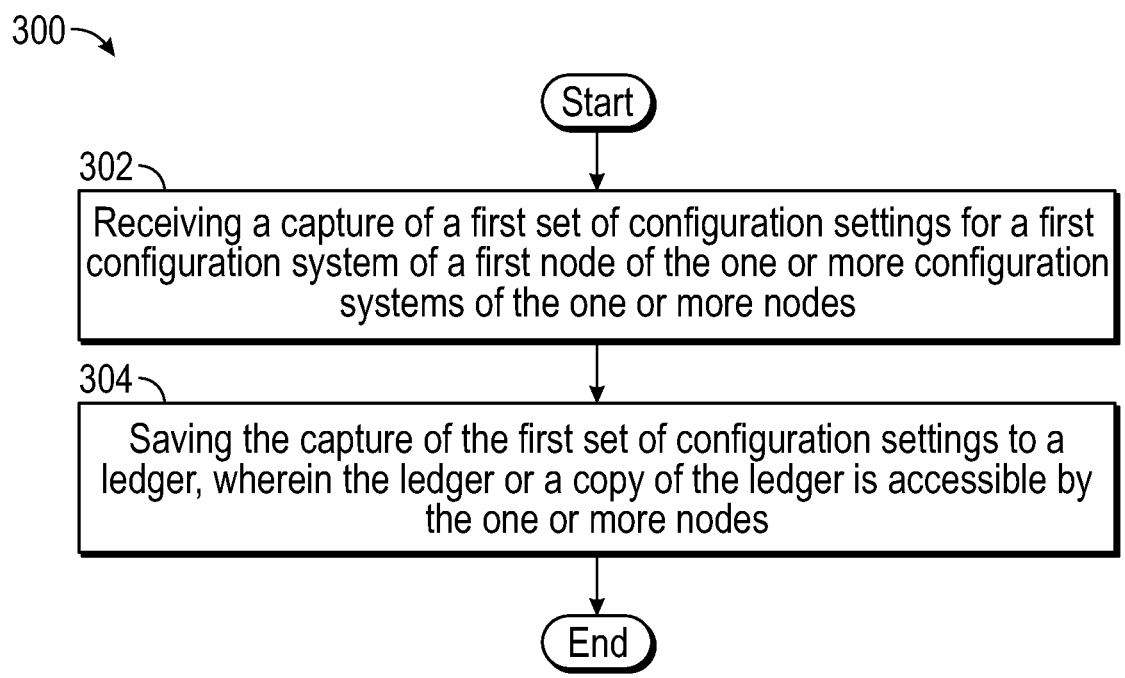
FIG. 3 depicts a flowchart of an example method in accordance with one or more example embodiments of the disclosure.

FIG. 3 is a flowchart of an example method of the present disclosure. In some embodiments, the method may include an operation 302 of receiving a first set of configuration settings for a first configuration system one or more configuration systems of a first node of one or more nodes. The first set of configuration settings may include settings for controlling certain features associated with a specific node. For example, the node may be a police cruiser and a configuration setting may involve performing a number of actions when the police cruiser's lights are turned on, such as locking the doors of the cruiser, initiating video recording, etc. Any number of such configuration settings may be associated with a node. The configuration system of the node may be a system that allows the configuration settings to be stored locally on the vehicle, and may also be responsible for performing any of the actions defied by the configuration settings.

In some embodiments, the method may include an operation 304 of saving the first set of configuration settings to a ledger, wherein the ledger or a copy of the ledger is accessible by the one or more nodes. Thus, many of the nodes may be apprised of configuration settings for any of the other nodes the ledger has received information about. For example, there may be a first node that is a first police cruiser and a second node that is a second police cruiser. The first police cruiser and second police cruiser may have different configuration settings for their configuration systems. These configuration settings may be shared across the ledger associated with the first police cruiser and the ledger associated with the second police cruiser such that the first police cruiser and second police cruiser both have information about the configuration settings of the two cruisers. Because the configuration settings for all of the different types of nodes is known by all nodes, reconfiguration of a node or configuration node of a similar type to a preexisting node may be simplified. For example, the first police cruiser may lose its configuration settings, but because the second police cruiser has access to a ledger that contains information about the first police cruiser's configuration settings, the first police cruiser can easily be reconfigured with the original configuration settings.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
   one or more vehicles, wherein the one or more vehicles comprise one or more Upfitter Interface Modules (UIMs), and wherein the one or more vehicles further comprise:
   at least one processor; and
   at least one memory storing computer-executable instructions, that when executed by the at least one processor, cause the at least one processor to:
   receive a first set of UIM settings for a first UIM of a first vehicle of the one or more UIMs of the one or more vehicles;
   save the first set of UIM settings to a ledger, wherein the ledger is accessible by the one or more vehicles;
   receive a request to validate a second set of UIM settings for the first UIM of the first vehicle;
   compare the second set of UIM settings to at least one or more previously-used UIM settings and one or more UIM setting rules;
   determine, based on the comparison, that the second set of UIM settings is validated; and
   send an indication that the second set of UIM settings is validated;
   implement the second set of UIM settings on the first vehicle; and
   save the second set of UIM settings and an indication that the second set of UIM settings are associated with the first vehicle to the ledger.

2. The system of claim 1, wherein the computer-executable instructions further cause the at least one processor to:
   compare identification information for a second vehicle to identification information for the first vehicle, wherein the identification information for the first vehicle is stored on the ledger;

determining that the identification information of the second vehicle matches the identification information for the first vehicle;

retrieving, from the ledger, the first set of UIM settings for the first vehicle; and saving the first set of UIM settings on a second UIM for the second vehicle.

\* \* \* \* \*